US008620163B1

(12) United States Patent
Sleator (10) Patent No.: US 8,620,163 B1
(45) Date of Patent: Dec. 31, 2013

(54) SYSTEMS AND METHODS FOR OPTICALLY COMMUNICATING SMALL DATA PACKETS TO MOBILE DEVICES (75) Inventor: Michael Sleator, Woodside, CA (US)

(73) Assignee: Google, Inc., Mountain View, CA (US)

( * ) Notice: Subject to any disclaimer, the term of this patent is extended or adjusted under 35 U.S.C. 154(b) by 0 days.

(21) Appl. No.: 13/490,500

(22) Filed: Jun. 7, 2012

(51) Int. Cl.
*H04B 10/00* (2013.01)

(52) U.S. Cl.
USPC ........... 398/118; 398/119; 398/130; 398/172; 398/202; 398/183; 398/128; 398/135; 398/138; 382/100; 382/202; 382/181; 348/116; 348/61; 348/207

(58) Field of Classification Search
USPC ......... 398/118, 119, 172, 128, 130, 135, 154, 398/155, 159, 182, 183, 193, 202, 208, 129, 398/131, 136, 120, 137, 138; 382/100, 202, 382/181, 107, 103; 348/207, 207.11, 116, 348/308, 61, 362
See application file for complete search history.

(56) References Cited

U.S. PATENT DOCUMENTS

| | | | | |
|---|---|---|---|---|
| 5,793,880 A * | 8/1998 | Constant | ........................ | 382/100 |
| 7,415,212 B2 * | 8/2008 | Matsushita et al. | ........... | 398/140 |
| 8,248,467 B1 * | 8/2012 | Ganick et al. | ................. | 348/116 |
| 2010/0172651 A1 * | 7/2010 | Nien et al. | ..................... | 398/135 |
| 2011/0052214 A1 * | 3/2011 | Shimada et al. | ............... | 398/202 |
| 2012/0155889 A1 * | 6/2012 | Kim et al. | ...................... | 398/193 |
| 2013/0028609 A1 * | 1/2013 | Staats et al. | ................... | 398/130 |

* cited by examiner

*Primary Examiner* — Hanh Phan
(74) *Attorney, Agent, or Firm* — MH2 Technology Law Group, LLP (57) ABSTRACT

Embodiments relate to methods, devices, and computer-implemented methods for receiving a modulated signal transmitted from at least one signal emitter. The method can include receiving at least one image that comprises image data representing the modulated signal received as radiation emitted from the at least one signal emitter, wherein the radiation represented in the image data comprises at least one period of the modulated signal and wherein the at least one image was captured by a camera of a computing device while a field of view of the camera was moving relative to the at least one signal emitter; analyzing, by at least one processor, the at least one image; extracting, based on the analyzing, the image data representing the radiation; and determining, from the image data that was extracted, the modulated signal transmitted by the at least one signal emitter.

16 Claims, 7 Drawing Sheets

SYSTEMS AND METHODS FOR OPTICALLY COMMUNICATING SMALL DATA PACKETS TO MOBILE DEVICES

TECHNICAL FIELD

The present teachings relate to systems and methods for optically communicating small data packets to mobile devices.

BACKGROUND

Various methods for conveying small amounts of data to a mobile reading device are in common use. For example, conventional methods use radio frequency identification (RFID), including near-field communication (NFC) tags, and printed codes, such as linear bar codes and two dimensional codes such as quick response (OR) and DataMatrix codes. Each particular method has potential drawbacks to their use. For example, some can only be read at a particular distance from the tag and some require dedicated reading hardware. Also, passive tags and printed codes cannot be changed once set or printed. Thus, it would be desirable to provide a mechanism to transmit information that does not have these limitations.

SUMMARY

In accordance with aspects of the present disclosure, a method for receiving at least one image that comprises image data representing the modulated signal received as radiation emitted from the at least one signal emitter, wherein the radiation represented in the image data comprises at least one period of the modulated signal and wherein the at least one image was captured by a camera of a computing device while a field of view of the camera was moving relative to the at least one signal emitter; analyzing, by at least one processor, the at least one image; extracting, based on the analyzing, the image data representing the radiation; and determining, from the image data that was extracted, the modulated signal transmitted by the at least one signal emitter.

In some aspects, an exposure time of the camera to capture the at least one image can be equal to or greater than the at least one period of the modulated signal. In some aspects, an exposure time of one image can be less than the period of the modulated signal, but the aggregate exposure time of the multiple images can be equal to or greater than the period.

In some aspects, the method can further comprise receiving information selected from the group consisting of linear velocity information, angular velocity information, linear acceleration information, angular acceleration information, and combinations thereof at which the computing device moves relative to the at least one signal emitter.

In some aspects, the method can further comprise determining from the information a start time and length of exposure to capture the image data representing the radiation in the at least one image.

In some aspects, the radiation can include a visible, infrared, or ultraviolet component, or any combination of visible, infrared, and ultraviolet components.

In some aspects, the radiation can include a modulation in brightness, wavelength, or both brightness and wavelength.

In some aspects, the method can further comprise determining a modulation pattern with which the radiation has been modulated.

In some aspects, the method can further comprise locating a preamble to the modulated pattern.

In some aspects, the method can further comprise determining an orientation, a change in orientation, or both the orientation and the change in orientation of the computing device using a gyroscope, an accelerometer, or both the gyroscope and the accelerometer coupled to the computing device.

In some aspects, the method can further comprise analyzing the radiation using the orientation, the change in orientation, or both.

In some aspects, the radiation can be modulated using protocols comprising on-off keying, amplitude shift keying, pulse width modulation, pulse position modulation, and combinations thereof.

In some aspects, the radiation can be received from more than one signal emitter.

in some aspects, the preamble can include information representative of frame boundaries of the modulated signal.

In some aspects, the gyroscope, the accelerometer, or both can be used to determine a path, along which the field of view of the camera of the computing device was moving.

In accordance with some aspects of the present disclosure, a computer readable storage medium is disclosed. The computer readable storage medium can comprise instructions that cause one or more processors to perform a method comprising receiving at least one image that comprises image data representing the modulated signal received as radiation emitted from the at least one signal emitter, wherein the radiation represented in the image data comprises at least one period of the modulated signal and wherein the at least one image was captured by a camera of a computing device while a field of view of the camera was moving relative to the at least one signal emitter; analyzing, by at least one processor, the at least one image; extracting, based on the analyzing, the image data representing the radiation; and determining, from the image data that was extracted, the modulated signal transmitted by the at least one signal emitter.

In accordance with some aspects of the present disclosure, a device is disclosed that can comprise one or more processors; a non-transitory computer-readable medium comprising instructions that cause the one or more processors to perform the method comprising: receiving at least one image that comprises image data representing a modulated signal received as radiation emitted from the at least one signal emitter, wherein the radiation represented in the image data comprises at least one period of the modulated signal and wherein the at least one image was captured by a camera of a computing device while the field of view of the camera of the computing device was moving relative to the at least one signal emitter; analyzing the at least one image; extracting the image data representing the radiation; and determining, from the image data that was extracted, the modulated signal transmitted by the at least one signal emitter.

In accordance with some aspects of the present disclosure, a device for modulating and transmitting a signal to a computing device is disclosed. The device can comprise at least one signal emitter operable to emit radiation; and a controller operable to control the at least one signal emitter to produce the radiation comprising a modulated signal that can be captured as at least one image that comprises image data representing the radiation emitted from the at least one signal emitter, wherein the radiation represented in the image data comprises at least one period of the modulated signal and wherein the at least one image was captured by a camera of a computing device while the field of view of the camera of the computing device was moving relative to the at least one signal emitter.

In some aspects, an exposure time of the camera to capture the at least one image can be equal to or greater than the at least one period of the modulated signal. In some aspects, the exposure time of one camera image can be less than the period of the modulated signal and an aggregate exposure time of multiple images is equal to or greater than the period of the modulated signal.

In some aspects, the controller can be operable to receive information selected from the group consisting of linear velocity information, angular velocity information, linear acceleration information, angular acceleration information, and combinations thereof at which the computing device moves relative to the at least one signal emitter. In some aspects, the controller can be operable to determine from the information a start time and length of exposure to capture the image data representing the radiation in the at least one image.

In some aspects, the radiation can be selected from the group consisting of a visible component, an infrared component, an ultraviolet component, and combinations thereof. The radiation can include a modulation selected from the group consisting of a modulation in brightness, a modulation in intensity, a modulation in wavelength, and combinations thereof.

DESCRIPTION OF DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings generally relate to methods and devices for conveying information, such as small packets of data, to a device, such as a smartphone. A built-in camera of the phone can receive and decode information, such as short bursts of data, sent by modulating the brightness, intensity, and/or wavelength of a light source, such as a light emitting diode, or an emitter. The device can also incorporate an accelerometer or gyroscope. A single frame can capture the entirety of the data due to the spatial displacement of the image imparted by motion of the camera and/or emitter. In some aspects, several frames can be captured in quick succession to increase the reliability of the data transfer. The camera can be moved in such a way that the camera's field of view is swept past the emitter. The emitter can be modulated in a continuously repeating cycle with the data to be transmitted. Because of the motion of the camera, the resulting image will contain a streak that is spatially modulated with the data. This streak can be identified within the image and decoded by image processing software in the camera or phone to recover the original data.

Reference will now be made in detail to examples of embodiments of the present teachings, which are illustrated in the accompanying drawings. Where possible the same reference numbers will be used throughout the drawings to refer to the same or like parts.

Figure 1:
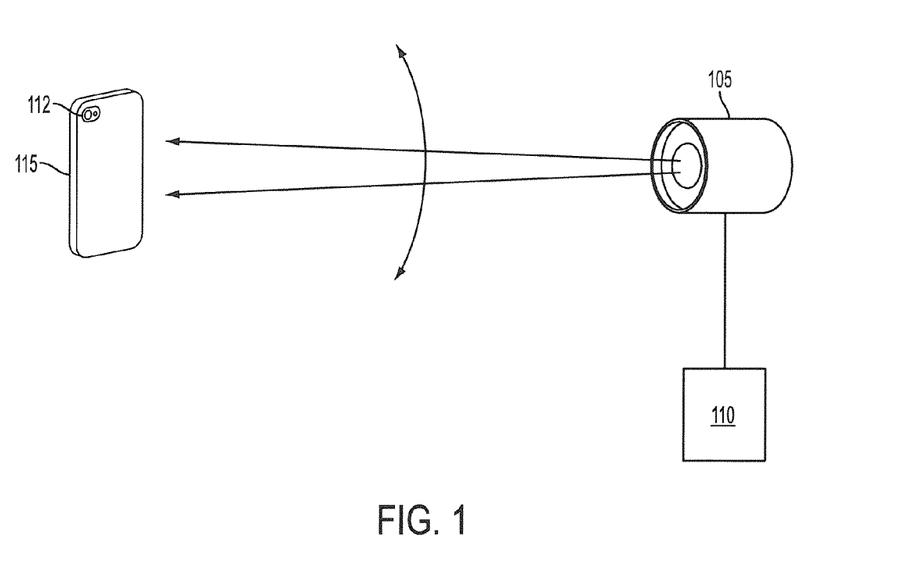
FIG. 1 is an example block diagram illustrating a system arranged to transmit and receive a modulated signal in accordance with aspects of the present disclosure.

FIG. 1 is an example block diagram illustrating a system arranged to transmit and receive a modulated radiation or signal in accordance with aspects of the present disclosure. It should be readily apparent to one of ordinary skill in the art that the system depicted in FIG. 1 represents a generalized schematic illustration and that other components/devices can be added, removed, or modified.

Referring to FIG. 1, emitter 105 can be arranged to emit radiation that can be modulated or encoded to carry information that can be recovered by demodulating or decoding the radiation. In some aspects, emitter 105 can be connected to or coupled with controller 110 that can control the operation of emitter 105 to produce the modulated radiation. Additionally or alternatively, controller can be integrated within emitter 105. By way of a non-limiting example, emitter 105 can be a light emitting diode (LED), a continuous radiation source operable to be modulated by an aperture-like arrangement, such as a spinning slotted disk, or other radiation sources that are operable to be modulated as described herein. Emitter 105 can be operable to produce radiation at a variety of wavelengths and/or at a variety of intensities or brightness levels. For example, emitter 105 can be operable to produce radiation having a visible, an infrared, or an ultraviolet component, or any combination of visible, infrared, and ultraviolet components.

Controller 110 can be operable to impart a modulation pattern into the radiation produced by emitter 105. The signal or information modulated into the radiation can have a predetermined period and controller 110 can direct emitter 105 to repeat the pattern at a predetermined repeating interval. By way of a non-limiting example, the modulation and data encoding can use an On-Off Keying (OOK) protocol, which can include turning the emitter on to represent a 1 and off to represent a 0. In some aspects, when emitter 105 is operable to emit radiation at multiple brightness levels, an Amplitude Shift Keying ("ASK") protocol can be used and can allow higher data rates in which the signal is transmitted by allowing each spatial location to represent more than one bit. In some aspects, the wavelength at which emitter 105 emits radiation can be modulated. In this example, the modulation can be detected as differential changes in the amplitude of two or more color channels. In some aspects, other modulation techniques or protocols can be used including pulse width modulation and pulse position modulation.

In some aspects, controller 110 can be connected to or coupled with an actuator (not shown) which can be operable to impart a periodic motion to emitter 105 in such a way that emitter 105 can be moved along a path while emitting radiation. In this example where emitter 105 is in motion, computing device 115 can be stationary.

Computing device 115 or camera 112 can be arranged to receive the modulated radiation produced by emitter 105 directly (line-of-sight) or reflected off a reflective surface.

Computing device 115 can be a mobile wireless communication device or a mobile device that can comprise various computing devices such as a desktop computer, a laptop or other portable computer, a smart phone, a personal digital assistant (PDA), and the like. A camera 112 can be incorporated into computing device 115 that can be operable to capture, within a single frame, the entirety of the data-modulated symbol by means of spatial displacement of the radiation within the image due to relative motion between the camera 112 and the emitter 105. The image can be captured by the camera 112 while the field of view of the camera 112 is moving relative to the emitter 105. The camera 112 can be moved in such a way that the camera's 112 field of view is swept past the emitter 105. Likewise, the emitter 105 can be moved in such a way that the radiation emitted by the emitter 105 is swept past the camera 112 or computing device 115. The emitter can be modulated in a continuously repeating cycle to provide the signal encoded or modulated with the data to be transmitted. Because of the motion of the camera 112, the resulting image will contain a streak, shown in FIGS. 4 and 5 and discussed below, that is spatially modulated according to the signal encoded with the data. This streak can be identified within the image and decoded by image processing software in the camera 112 or the computing device 115 to recover the data encoded or modulated within the signal.

The motion imparted to the camera 112 or the computing device 115 can be such that the streak can have little, if any, overlap. For example, one type of motion that can be imparted to the camera 112 or computing device 115 can include a rotation that produces a circular or a spiral streak that can form a long, non-overlapping path. Another type of motion can be a back-and-forth-type oscillation that can be achieved by twisting the camera 112 or the computing device 115 around a center of motion, which can result in the streak being folded back on itself. An accelerometer and/or gyroscope in the camera 112 or computing device 115 can be used to cause the camera 112 to capture images only during that portion of the oscillation that produces an image having little, if any, overlap regions. The gyroscope can be operable to determine or extract information representing angular velocity and the accelerometer can be operable to determine or extract information representing linear or angular acceleration of the camera 112 or computing device 115 relative to an inertial frame of reference. A linear velocity relative to a particular set of starting conditions can be derived from the angular velocity, linear acceleration, and/or angular acceleration. For example, if a starting condition is a state of rest relative to the emitter, and assuming that the emitter stays at rest in that frame of reference, then the linear velocity relative to the emitter can be derived. For example, velocity and/or acceleration data can be used to determine at which point the camera 112 or computing device 115 has begun to repeat the back-and-forth motion or determine a path, along which the field of view of the camera 112 of the computing device 115 was moving. For example, the point or region at which the camera 112, computing device 115, or emitter 105 change direction at the extremes of an oscillating motion can lead to the radiation or signal being captured as an image having an overlap region. This overlap region can render the portion of the image difficult to decode or demodulate since different portions of the signal can be captured at the same region of the image. Therefore, the accelerometer and/or gyroscope can be used in conjunction with an application operating on the computing device 115 to instruct the camera 112 not to capture images during these extreme motion positions where overlap can occur.

The computing device 115 can be operable to confirm through a user feedback mechanism, such as a visual, audible, and/or tactile indication that image was captured. In some aspects, additional feedback can be provided to the user to help the user learn optimal or near-optimal rate and amplitude of the oscillations, where optimal or near-optimal refers to a rate and amplitude of oscillation that captures little, if any, overlap of the streak.

The information or data provided to the emitters 105 can be arranged to be modulated or encoded in one or more data symbols, such that the boundaries of the individual symbols modulated or encoded in the overall data packet can be determined. A symbol is the minimal unit of signaling. The act of sending a signal entails selecting one symbol from an alphabet of two or more symbols and transmitting the selected symbol, where 'transmitting" means setting the state of the channel to a representation of that symbol. In the case of an alphabet consisting of only two symbols, a symbol represents one bit of information. With an alphabet of four symbols, each symbol represents two bits (i.e., a one-out-of-four choice). This requires the communications channel support four distinct states, for example, four distinguishable amplitude levels.

For example, recovery of the data or symbol positions can be achieved using a line code. In particular, a line code with a relatively high clock content can be used since there can be a large variation in the rate of motion of the camera 112 during an exposure. For example, a line code with a high clock content, such as, Manchester encoding can be used. In this example encoding scheme, at least one transition is used for every symbol, regardless of the data pattern, at a cost of devoting half of the channel capacity to clock information. "Non-Return-to-Zero" encoding, by contrast, has no imbedded clock information, so a long run of a single symbol has no transitions in the line state. This makes efficient use of the channel for data, but in a classical communications channel this can be difficult to properly decode because of drift between the transmitter clock and the receiver clock. Run-length-limited codes are an intermediate form that guarantee at least one transition every N symbol times. In the context of this disclosure, low clock content causes difficulty because of the non-constant rate of relative motion between the source (or emitter) and the camera 112 field of view. This is analogous to clock drift with a normal channel. In some aspects, data from the accelerometer and/or the gyroscope can be used since the higher-order derivatives of the motion tend to be well-behaved and can allow for a velocity prediction algorithm to reduce the dock content requirement. In some aspects, the direction of motion can be inferred from the accelerometer data. In some aspects, a fixed preamble can be used that is unambiguous with the symbol coding can be used to mark the packet boundaries. The preamble can also serve to indicate the direction of motion.

The amount of data that can be communicated can be dependent on a number of factors including, for example, the number and arrangement of the emitters and the operation of the camera 112. For example, using a single emitter and OOK modulation (500 µs bit time, 100 ms exposure time), about 200 raw bits can be communicated. For a 4-level ASK modulation, the amount of data communicated could double to about 400 raw bits. For a single tri-color emitter, the amount of data could be about 1200 bits. A portion of this raw capacity can be consumed by the encoding overhead necessary to allow correct identification of symbol and frame boundaries and another portion can be given to error correction coding. Thus, the payload capacity of a single tri-color emitter 4-ASK scheme can be about 600 bits, which can be suitable to communicating information including, for example, URLs, telephone numbers, and similar messages.

Figure 2:
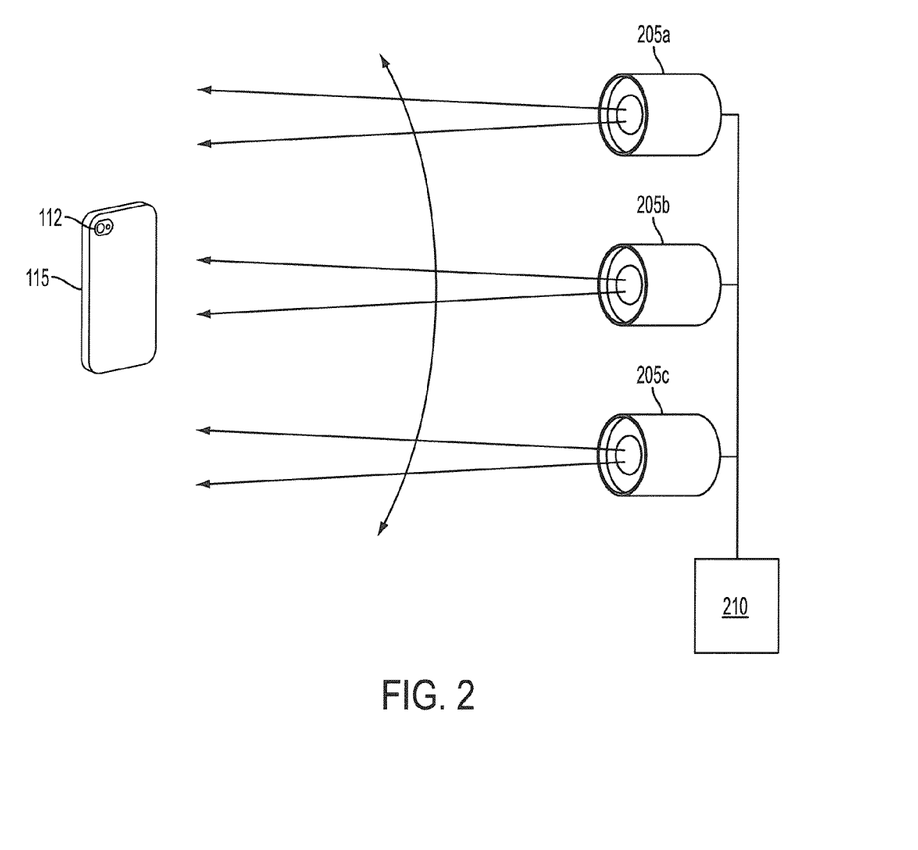
FIG. 2 shows a system with more than one emitter operable to produce a modulated radiation pattern that can be detected by computing device in accordance with aspects of the present disclosure.

FIG. 2 is an example block diagram, similar to FIG. 1, illustrating a system arranged to transmit and receive a modulated signal in accordance with aspects of the present disclosure. It should be readily apparent to one of ordinary skill in the art that the system depicted in FIG. 2 represents a generalized schematic illustration and that other components/devices can be added, removed, or modified.

FIG. 2 shows a system with more than one emitter operable to produce a modulated radiation pattern that can be detected by computing device. In FIG. 2, emitters 205a, 205b, are 205c are shown in a linear arrangement. Although only three emitters are shown in this example, two emitter or four or more emitters can be used. Moreover, the linear arrangement is just one example arrangement using multiple emitters. Other suitable arrangements for the emitters can also be used. For example, the emitters can be arranged in a clustered formation. Controller 210 can be operable to control operation of each emitter 205a, 205b, and 205c. In the multiple emitter arrangement, each emitter 205a, 205b, and 205c can be operable to transmit a part of the information or signal, which then can be captured as a separate streak by the camera 112 or computing device 115. Additionally or alternatively, each emitter 205a, 205b, and 205c can be operable to emit radiation in a visible, an infrared, an ultraviolet component, or any combination of visible, infrared, and ultraviolet range and can be operable to be modulated or encoded using a modulation selected from the group consisting of a modulation in brightness, a modulation in intensity, a modulation in wavelength, and combinations thereof. In some aspects, each emitter 205a, 205b, and 205c can be arranged with its own individual controller (not shown) and actuator (not shown) that is operable to impart periodic motion to the respective emitters.

in the arrangement of FIGS. 1 and 2, if a single camera frame is used to capture the radiation, then the computing device 115 can be operated such that an exposure time of the camera 112 to capture the at least one image is greater than the at least one period of the modulated signal encoded in the radiation. However, if more than one camera frame is being used, then the an exposure time of one image can be less than the period of the modulated signal, so long as the aggregate non-overlapping exposure time of the multiple images is greater than the period.

In some aspects, the camera 112 or computing device 115 can be operable to process different wavelengths through a color sensor. In this aspect, multiple co-located emitters of different wavelength can allow higher data rates to be transmitted by processing each wavelength as an independent channel.

A linear array of emitters 205a, 205b, and 205c oriented perpendicularly to the expected mean trajectory of the camera's 112 view can also be used to increase the data rate. Depending on the field of view of the camera 112, two independent linear arrays of emitters that are spatially separated and oriented along perpendicular axes can be employed such that, for any likely camera 112 trajectory, the individual elements of one array or the other are distinguishable in the image. Two perpendicular linear arrays, each emitting a different wavelength, could also be co-located without interference.

The spatial extent of the emitters 205a, 205b, and 205c can be very small, such that the emitters can be incorporated into advertisements and other designs with minimal disruption. In some aspects, radiation from independent emitters can be captured simultaneously. The spacing of the individual emitters can determine to extent to which the camera 112 can capture the modulated signal. For example, if the emitters 205a, 205b, and 205c are spaced too close to each other, a non-overlapping signal may be difficult to capture. Also, if the emitters 205a, 205b, and 205c are spaced too far apart with the user rotating the camera 112 so that the field of view is (ideally) moving perpendicular to the line along which the emitters 205a, 205b, and 205c lie, the signal for each emitter may be difficult to capture within the field of view of a typical camera 112 since the limiting factor is the field of view of the camera 112 in the emitter axis.

The multiple emitter arrangement can be employed in commercial settings where multiple advertising tags from different stores and signs can be captured in a single operation. In another example, the camera 112 can be used with an application for finding friends in a crowd. By using the camera flash LED as a transmitter sending an agreed-upon code, others can find that phone simply by panning their cameras 112 across the crowd.

Figure 3:
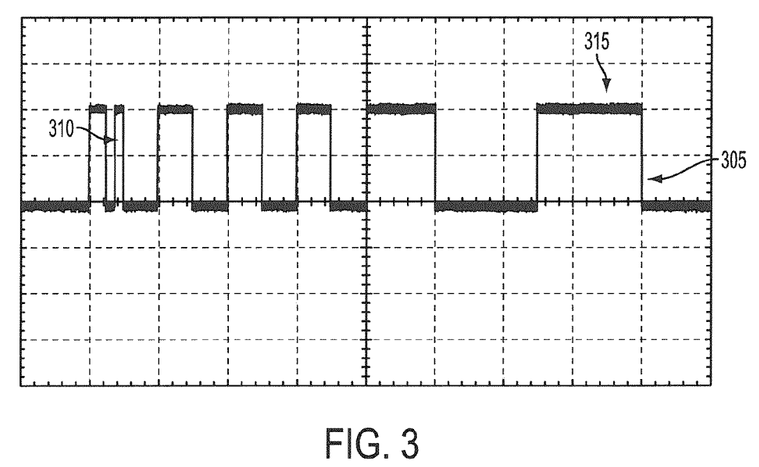
FIG. 3 shows an example test waveform that can be transmitted from controller to emitter in accordance with aspects of the present disclosure.

FIG. 3 shows an example test waveform that can be transmitted from controller 110 to emitter 105. Waveform 305 can include features ranging in size from about 500 μs at 310 to as large as 3 milliseconds at 315. The upper limit of the feature size is limited by the ability of the camera 112 or computing device 115 to discern symbol boundaries, as discussed above regarding clock content.

Figure 4:
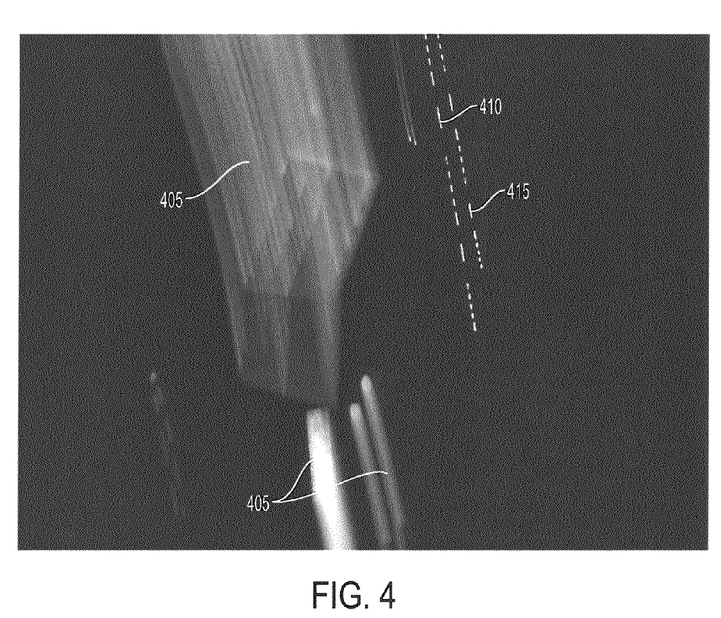
FIG. 4 shows an example image captured by the camera of the computing device in accordance with aspects of the present disclosure.

FIG. 4 shows an example image captured by the camera of the computing device. The image includes background objects 405 which become blurred due to the motion of the camera and modulated signal 410 and 415. Radiation encoded with modulated signals 410 and 415 are captured as streaks while the camera is moving in different directions in a back-and-forth manner. The modulated signal or radiation can be imparted by an emitter controlled by a controller, as described in relation to FIGS. 1 and 2. The emitter can be operable to emit radiation in a visible, an infrared, an ultraviolet component, or any combination of visible, infrared, and ultraviolet range and can be operable to be modulated or encoded using a modulation selected from the group consisting of a modulation in brightness, a modulation in intensity, a modulation in wavelength, and combinations thereof.

In FIG. 4, the emitter can be controlled to impart a modulation pattern onto the signal 410 and 415, using a variety of modulation schemes, as discussed above. The simplest modulation scheme involves repeatedly turning the emitter on and off. This modulated pattern can be captured by the camera or computing device as a series of dots or dashes, representative of when the emitter is turned on, interspersed with dark regions, representative of when the emitter is turned off. The dots or dashes can represent a "1" and the dark region can represent a "0," using this simplistic example. The reverse encoding scheme can also be used, where the dots or dashes represent a "0" and the dark region represents a "1".

An application operating with the camera or on the computing device 115 can be operable to demodulate or decode the image captured by the camera using the encoding scheme, or its inverse decoding scheme, that was employed in the encoding process. The application can be operable to determine which portions of the image contain the modulated or encoded information and to apply the appropriate decoding scheme to that portion of the image which was determined to contain the encoded information.

Figure 5:
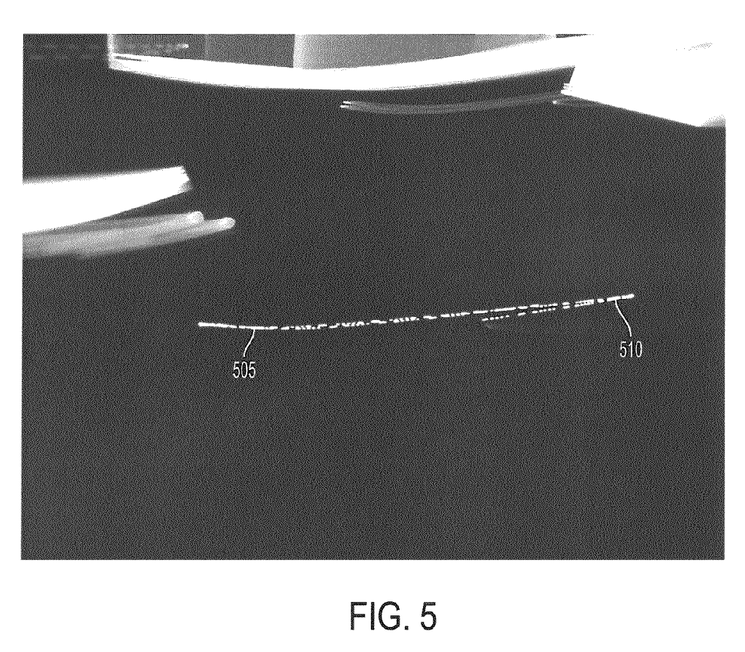
FIG. 5 shows another example image captured by the camera of the computing device in accordance with aspects of the present disclosure.

FIG. 5 shows another example image captured by the camera of the computing device. The modulated signal 505 as represented as the streak has an overlap region 510 that can result when the camera is moved in a back-and-forth manner. An accelerometer and/or gyroscope can be used to control the exposure of the camera to prevent or reduce the amount of overlap in the modulated data captured by the camera. The accelerometer and/or gyroscope can be used to determine a point or region at which motion imparted to the camera or computing device 115 moves or folds back on it, which can be captured as an overlap region. The remaining portion of the captured signal or radiation that does not overlap can be analyzed to determine to information encoded or modulated onto the signal using, for example, an application operable on computing device 115.

Figure 6:
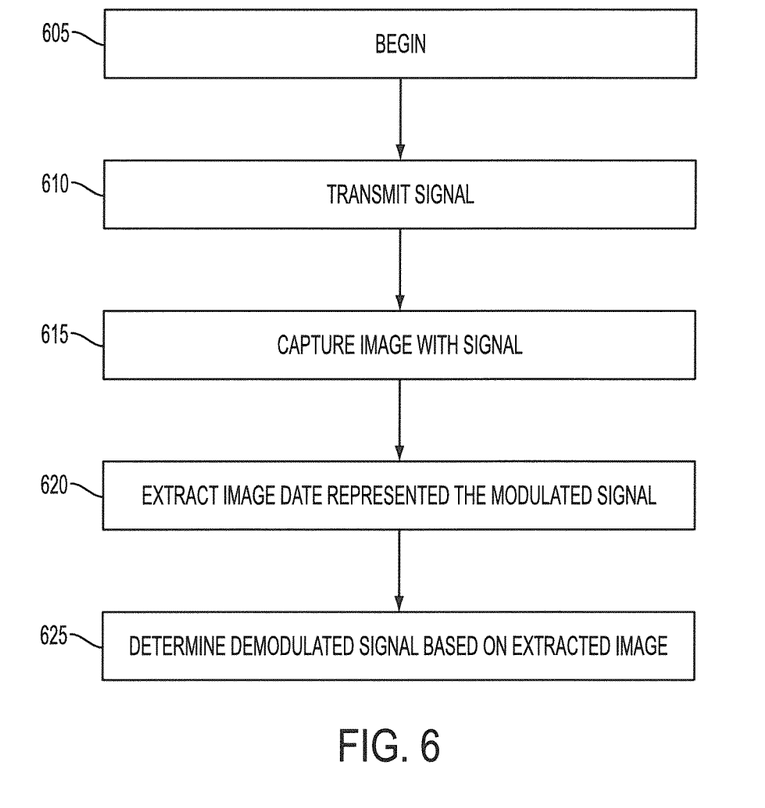
FIG. 6 illustrates a flowchart for the communication of modulated signal in accordance with aspects of the present disclosure.

FIG. 6 illustrates a flowchart for the communication of modulated signal in accordance with aspects of the present disclosure. In 605, processing can begin. In 610, one or more emitters can be provided a signal from a controller with which to instruct the emitter to transmit the data. The signal or another signal can instruct an actuator to oscillate the emitter in a random or a predictable pattern. A random pattern can be used so long as there is sufficient non-overlapping length to expose all of the data modulated in the radiation. In 615, the computing device can receive an input to invoke a camera application that is operable to receive and process the modulated signal. The input can cause the camera to receive at least one image that comprises image data representing radiation emitted from the at least one signal emitter. In some aspects, the radiation represented in the image data can comprise at least one period of the modulated signal. The image can be captured while the field of view of the camera is moving relative to the at least one signal emitter. At 620, a processor, for example, a processor of the computing device, can analyze the image to extract the image data representing the modulated signal. At 625, the modulated signal transmitted by the at least one signal emitter can be determined based on the extracted image data. For example, an application operating on computing device 115 can be operable to demodulate or decode the captured image using one or more demodulating or decoding algorithms. In some aspects, the application can allow a user to select an appropriate algorithm. Additionally or alternatively, the application can automatically determine the appropriate algorithm based, at least in part, on information transmitted by the emitters, or a trial-and-error approached based on algorithms stored on computing device 115. Other suitable methods of demodulating or decoding the radiation or signal can be used.

Figure 7:
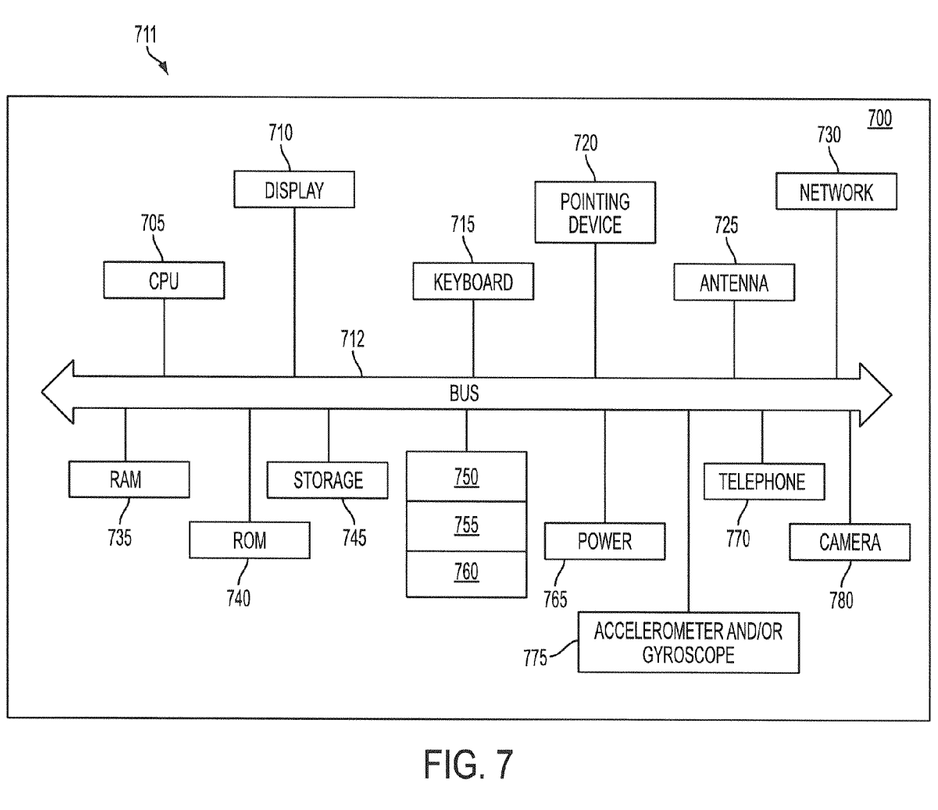
FIG. 7 shows an example architecture of computing device in accordance with aspects of the present disclosure.

FIG. 7 shows an example architecture of computing device, for example computing device 115. Computing device 115 can include central processing unit (CPU) 705 where the computer instructions that comprise an operating system or an application are processed. Computing device can include a plurality of interfaces, including display interface 710 that provides a communication interface and processing functions for rendering video, graphics, images, and texts on display (not shown), keyboard interface 715 that provides a communication interface to keyboard (not shown), pointing device interface 720 that provides a communication interface to pointing device (not shown), antenna interface 725 that provides a communication interface to antenna (not shown), network connection interface 730 that provides a communication interface to a network (not shown) over computer network connection (not shown).

Computing device 115 can also include random access memory (RAM) 735 where computer instructions and data are stored in a volatile memory device for processing by CPU 705; read-only memory (ROM) 740 where invariant low-level systems code or data for basic system functions such as basic input and output (I/O), startup, or reception of keystrokes from keyboard are stored in a non-volatile memory device; storage medium 745 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 750, application programs 755 including, for example, web browser application, email application and/or other applications, and data files 760 are stored; power source 765 that provides an appropriate alternating current (AC) or direct current (DC) to power components; telephony subsystem 770 that allows the device to transmit and receive sound over a telephone network; accelerometer and/or gyroscope module 775; camera subsystem 780, and bus 712 that allows communication among the various components of device.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for receiving a modulated signal transmitted from at least one signal emitter, the method comprising:
    receiving at least one image that comprises image data representing the modulated signal received as radiation emitted from the at least one signal emitter, wherein the radiation represented in the image data comprises at least one period of the modulated signal and wherein the at least one image was captured by a camera of a computing device while a field of view of the camera was moving relative to the at least one signal emitter, and wherein an exposure time of the camera to capture the at least one image is equal to or greater than the at least one period of the modulated signal;
    analyzing, by at least one processor, the at least one image;
    extracting, based on the analyzing, the image data representing the radiation; and
    determining, from the image data that was extracted, the modulated signal transmitted by the at least one signal emitter.

2. The method according to claim 1, further comprising receiving information selected from the group consisting of linear velocity information, angular velocity information, linear acceleration information, angular acceleration information, and combinations thereof at which the computing device moves relative to the at least one signal emitter.

3. The method according to claim 2, further comprising determining from the information a start time and length of exposure to capture the image data representing the radiation in the at least one image.

4. The method according to claim 1, wherein the radiation is selected from the group consisting of a visible component, an infrared component, an ultraviolet component, and combinations thereof.

5. The method according to claim 1, wherein the radiation includes a modulation selected from the group consisting of a modulation in brightness, a modulation in intensity, a modulation in wavelength, and combinations thereof.

6. The method according to claim 1, further comprising determining a modulation pattern with which the radiation has been modulated.

7. The method according to claim 6, further comprising locating a preamble to the modulated pattern.

8. The method according to claim 7, wherein the preamble includes information representative of frame boundaries of the modulated signal.

9. The method according to claim 1, further comprising determining an orientation, a change in orientation, or both the orientation and the change in orientation of the computing device using a gyroscope, an accelerometer, or both the gyroscope and the accelerometer coupled to the computing device.

10. The method according to claim 9, further comprising analyzing the at least one image using the orientation, the change in orientation, or both.

11. The method according to claim 9, wherein the gyroscope, the accelerometer, or both are used to determine a path, along which the field of view of the camera of the computing device was moving.

12. The method according to claim 1, wherein the radiation is modulated using protocols selected from the group consisting of: on-off keying, amplitude shift keying, pulse width modulation, wavelength modulation, and pulse position modulation.

13. The method according to claim 1, wherein the radiation is received from more than one signal emitter.

14. A non-transitory computer readable storage medium comprising instructions that cause one or more processors to perform a method comprising:
   receiving at least one image that comprises image data representing a modulated signal received as radiation emitted from the at least one signal emitter, wherein the radiation represented in the image data comprises at least one period of the modulated signal and wherein the at least one image was captured by a camera of a computing device while the field of view of the camera of the computing device was moving relative to the at least one signal emitter, and wherein an exposure time of the camera to capture the at least one image is equal to or greater than the at least one period of the modulated signal;
   analyzing the at least one image;
   extracting the image data representing the radiation; and
   determining, from the image data that was extracted, the modulated signal transmitted by the at least one signal emitter.

15. The non-transitory computer readable storage medium according to claim 14, further comprising receiving information selected from the group consisting of linear velocity information, angular velocity information, linear acceleration information, angular acceleration information, and combinations thereof at which the computing device moves relative to the at least one signal emitter.

16. A device comprising:
   one or more processors;
   a non-transitory computer-readable medium comprising instructions that cause the one or more processors to perform the method comprising:
   receiving at least one image that comprises image data representing a modulated signal received as radiation emitted from the at least one signal emitter, wherein the radiation represented in the image data comprises at least one period of the modulated signal and wherein the at least one image was captured by a camera of a computing device while the field of view of the camera of the computing device was moving relative to the at least one signal emitter, and wherein an exposure time of the camera to capture the at least one image is equal to or greater than the at least one period of the modulated signal;
   analyzing the at least one image;
   extracting the image data representing the radiation; and
   determining, from the image data that was extracted, the modulated signal transmitted by the at least one signal emitter.

* * * * *